United States Patent
Reed et al.

[19]

[11] Patent Number: 6,115,198
[45] Date of Patent: Sep. 5, 2000

[54] PR4 SAMPLED AMPLITUDE READ CHANNEL FOR DETECTING USER DATA AND EMBEDDED SERVO DATA

[75] Inventors: David E. Reed, Westminster; William G. Bliss, Thornton, both of Colo.

[73] Assignee: Cirrus Logic, Inc., Austin, Tex.

[21] Appl. No.: 08/960,471

[22] Filed: Oct. 29, 1997

[51] Int. Cl.$^7$ ............................................. G11B 5/09
[52] U.S. Cl. ........................ 360/46; 360/49; 360/65; 360/53
[58] Field of Search ................... 360/46, 49, 65, 360/53, 51, 45, 78.14; 375/263

[56] References Cited

U.S. PATENT DOCUMENTS

| | | | |
|---|---|---|---|
| 5,274,510 | 12/1993 | Sugita et al. | |
| 5,291,499 | 3/1994 | Behrens et al. | |
| 5,424,881 | 6/1995 | Behrens et al. | |
| 5,497,384 | 3/1996 | Fredrickson et al. | |
| 5,521,945 | 5/1996 | Knudson | 360/65 X |
| 5,585,975 | 12/1996 | Bliss | |
| 5,729,396 | 3/1998 | Dudley et al. | 360/51 |
| 5,737,142 | 4/1998 | Zook | 360/49 |
| 5,754,353 | 5/1998 | Behrens et al. | 360/53 |
| 5,841,602 | 11/1998 | Kanegae et al. | 360/51 |
| 6,005,727 | 12/1999 | Behrens et al. | |

OTHER PUBLICATIONS

Cideciyan, Dolivo, Hermann, Hirt, Schott, "A PRML System for Digital Magnetic Recording", IEEE Journal on Selected Areas in Communication vol. 10, No. 1, pp. 38–56, Jan. 1992.

*Primary Examiner*—Alan T. Faber
*Attorney, Agent, or Firm*—Howard H. Sheerin; Dan Shifrin

[57] ABSTRACT

A partial response class-IV (PR4) sampled amplitude read channel is disclosed for detecting user data and embedded servo data. The detected servo data is encoded using a novel servo code capable of accurately decoding detected codewords representing servo track address during seek operations, even when the recording head flies between two adjacent tracks, and capable of correcting errors in the detected codedwords caused by noise in the read signal, such as inter-symbol interference. In one embodiment, the servo code corrects certain minimum distance error events, such as a bit shift error event, associated with a trellis type sequence detector. To achieve the equivalent effect of a conventional Gray code, the codewords are arranged such that adjacent track addresses differ by a number of bits relative to the minimum distance error events corrected. In this manner, when the recording head spans two adjacent tracks during a seek operation, the ambiguity in the detected codeword will be resolved in favor of one of the adjacent track addresses. To further increase performance, the servo data PR4 sample values are converted into an EPR4 response and detected with a sliding threshold detector. This modification provides the same performance gain as a PR4 sequence detector matched to a d=1 constraint, but at less cost. One of the PR4 sliding threshold detectors for detecting user data can be advantageously shared to detect the servo data-the only additional hardware required is a 1+D filter for converting the PR4 samples of the servo data to EPR4 samples.

18 Claims, 8 Drawing Sheets

PR4 SAMPLED AMPLITUDE READ CHANNEL FOR DETECTING USER DATA AND EMBEDDED SERVO DATA

FIELD OF INVENTION

The present invention relates to the control of disk storage systems for digital computers, particularly to a partial response class-IV (PR4) read channel for detecting user data and embedded servo data using a sliding threshold detector.

BACKGROUND OF THE INVENTION

Magnetic and optical disk storage devices are commonly used by host computer systems to store large amounts of digital data in a non-volatile manner. Typically, the disk storage medium spinning within the storage device is partitioned into a number of data tracks (concentrically spaced for magnetic and concentric or spiral for optical), where each data track is further partitioned into a number of data sectors. To write and read data to and from a target data sector on a particular track, a recording head (read/write head) is positioned over the track by a servo controller. Then, to write data to the track, the data serves to modulate a current in a write coil (or intensity of a laser beam) of the recording head in order to write a sequence of corresponding magnetic flux (or reflective optical) transitions onto the surface of the disk. To read this recorded data, the recording head again passes over the track and transduces the magnetic flux (or reflective optical) transitions into an analog read signal comprising a sequence of pulses representing the recorded data. These pulses are then detected and decoded into an estimated data sequence by a read channel and, in the absence of errors, the estimated data sequence matches the recorded data sequence.

Figure 1A:
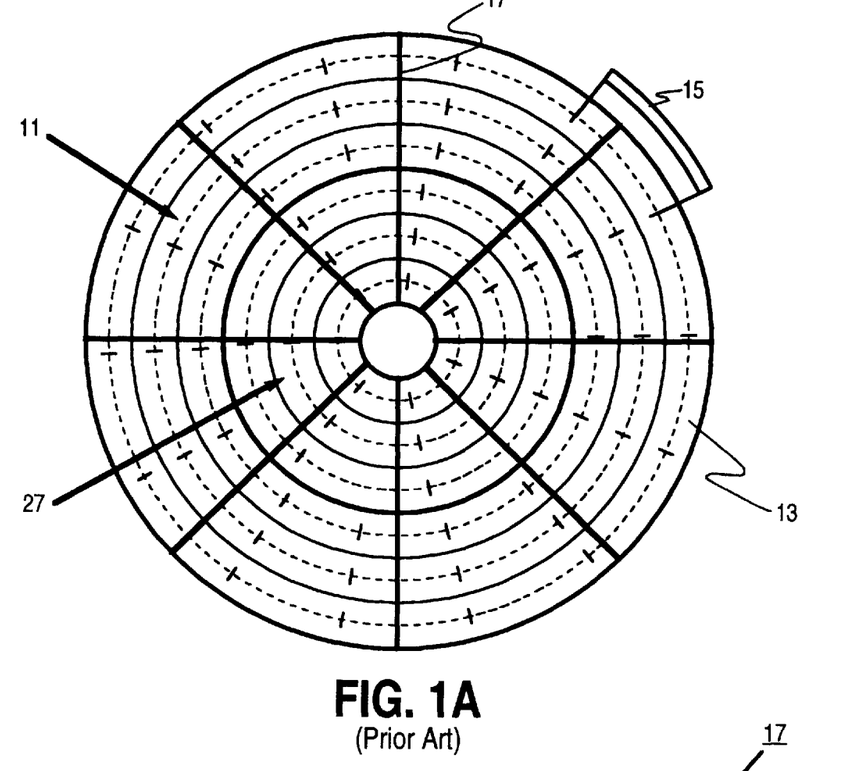
FIG. 1A shows an example format of a disk storage medium comprised of a plurality of concentric data tracks and embedded servo wedges, where each data track is partitioned into a plurality of data sectors.
Figure 1B:
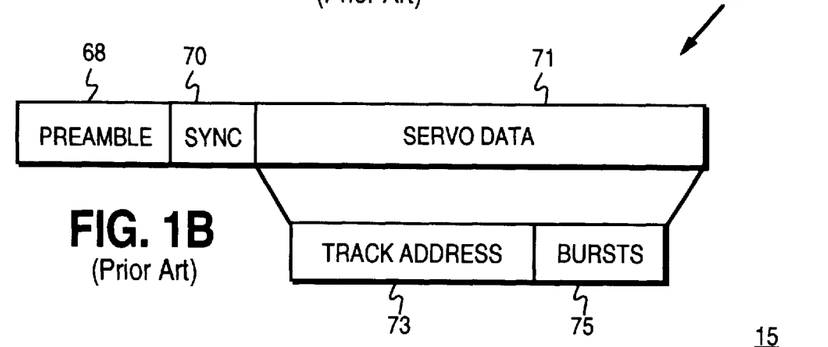
FIG. 1B shows an example format of a servo sector of a servo wedge, where the servo data typically comprises a track address for coarse positioning of the recording head over the disk, and servo bursts for fine positioning the recording head over a centerline of the track.

FIG. 1A shows a typical format of a disk storage medium wherein the data tracks 13 are recorded as concentric, radially spaced "rings" of information. Each track comprises a predetermined number of data sectors 15 with embedded servo wedges or servo spokes 17 recorded at a regular interval around the disk. The embedded servo wedges are processed by a servo controller in order to position the recording head over a selected track during read and write operations. As shown in FIG. 1B, each servo sector of a servo wedge typically comprises timing information (preamble 68 and sync 70) for synchronizing to the servo data 71 (similar to a data sector 15 shown in FIG. 1C), where the servo data 71 includes a track address 73 for coarse positioning the recording head over a selected track, and servo bursts 75 located at precise intervals and offsets for fine positioning the recording head over the centerline of the selected track.

Thus, during read and write operations the servo controller performs two functions: seeking to a selected track using the track addresses, and tracking the centerline of the track using the servo bursts. Seeking to a selected track entails moving the recording head radially over the surface of the disk until it reaches the target track. As the recording head traverses radially over the disk, the servo controller reads the current track address recorded in the embedded servo wedges to determine the current location of the recording head. An intrinsic design consideration is that when seeking to a selected track the recording head may fly between two adjacent tracks when reading the servo wedge. If so, it is important that the detected track address decode into one of the two adjacent track addresses to avoid errors in the operation of the servo controller.

Figure 4:
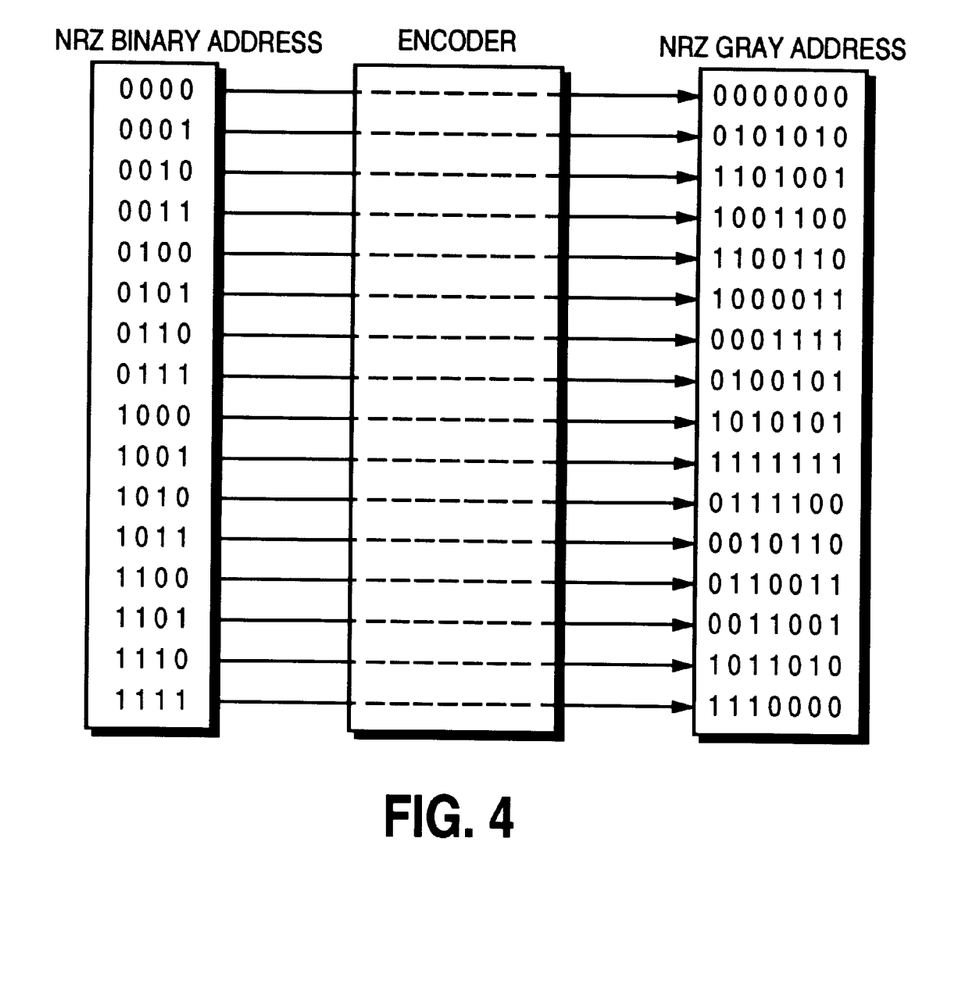
FIG. 4 illustrates an embodiment of the present invention which uses a (7,4) Hamming code capable of correcting a single bit error in a detected codeword, and arranged such that codewords representing adjacent track addresses differ in a number of bits equal to the minimum distance of the Hamming code to effectuate the conventional Gray code constraint.

Prior art disk storage systems typically employ a coding technique, referred to as a Gray code, for ensuring that the ambiguity in the detected address due to intertrack interference is resolved in favor of one of two adjacent track addresses. The enabling characteristic of a Gray code is that codewords representing adjacent track addresses differ by only one adjacent bit in the NRZ domain (two adjacent bits in the NRZI domain). FIG. 4 shows a conventional servo encoder which encodes NRZ binary track addresses into NRZ Gray code track addresses recorded to the disk, where adjacent NRZ Gray code track addresses are different in only one bit. In this manner, when the recording head flies between two adjacent tracks during a seek operation, the ambiguity in the detected codeword will be resolved in favor of one of the two adjacent track addresses.

Another intrinsic design consideration in developing a servo system for disk storage systems is the integrity of the detected servo data. Errors in the detected servo data caused by noise in the read signal degrade the performance of the servo controller in both the seeking and tracking operations. Conventionally, the servo data in the servo wedges 17 are recorded at a very low density, thereby minimizing the errors caused by intersymbol interference (ISI). Additionally, magnetic storage systems normally record the servo data with a d=1 run-length limited (RLL) code constraint to prevent writing adjacent magnetic transitions, thereby minimizing errors caused by a phenomenon known as non-linear transition shift (NLTS). NLTS occurs when the demagnetizing field from a first transition interacts with the field of the write head and shifts the position of an immediately following transition as it is written to the disk.

Although error correction codes (ECC) are well known (e.g., Hamming, CRC, Reed-Solomon, etc.) and typically employed to correct errors in the user data of the data sectors, such codes are normally not used to correct errors in the servo data. The reason ECC is not used to correct servo data is presumably due to the above described Gray code constraint. That is, servo data cannot be encoded using a conventional error correcting code, such as a Hamming code, and then arranged such that adjacent track addresses are different in only one bit.

A modern trend in disk storage systems is to increase the amount of data stored in the servo wedges; for example, the servo wedges may include data for locating the relative position of the data sectors in what are referred to as"ID-Less" disk storage systems. As the amount of data in the servo wedges increases, the servo wedges begin to consume a significant amount of the recordable area of the track. One way to reduce the area consumed by the servo wedges is to increase the recording density of the servo wedges, but as described above, this increases the number of errors caused by ISI.

There is, therefore, a need for a servo coding scheme that improves the data integrity of the servo data in general, thereby allowing faster seeking operations and more reliable tracking operations. Furthermore, there is a need for a servo coding scheme that allows for a higher recording density by compensating for the increased number of bit errors due to the increase in ISI.

SUMMARY OF THE INVENTION

A partial response class-IV (PR4) sampled amplitude read channel is disclosed for detecting user data and embedded servo data. The detected servo data is encoded using a novel servo code capable of accurately decoding detected codewords representing servo track address during seek operations, even when the recording head flies between two adjacent tracks, and capable of correcting errors in the detected codewords caused by noise in the read signal, such as inter-symbol interference. In one embodiment, the servo code corrects certain minimum distance error events, such as a bit shift error event, associated with a trellis type sequence detector. To achieve the equivalent effect of a conventional Gray code, the codewords are arranged such that adjacent track addresses differ by a number of bits relative to the minimum distance error events corrected. In this manner, when the recording head spans two adjacent tracks during a seek operation, the ambiguity in the detected codeword will be resolved in favor of one of the adjacent track addresses. To further increase performance, the servo data PR4 sample values are converted into an EPR4 response and detected with a sliding threshold detector. This modification provides the same performance gain as a PR4 sequence detector matched to a d=1 constraint, but at less cost. One of the PR4 sliding threshold detectors for detecting user data can be advantageously shared to detect the servo data—the only additional hardware required is a 1+D filter for converting the PR4 samples of the servo data to EPR4 samples.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Data Format

For illustration purposes, FIG. 1A shows an exemplary data format of a storage disk comprising a series of concentric data tracks 13 wherein each data track 13 comprises a plurality of sectors 15 with embedded servo wedges 17. The embedded servo wedges are typically written onto the disk using a specialized servo writer after the disk is manufactured; it is important that the storage system not overwrite the servo wedges during normal operation. Each servo sector of a servo wedge comprises a preamble 68 and sync field 70 for synchronizing to the servo data 71 as shown in FIG. 1B. The servo data 71 typically comprises a track address 73 for coarse positioning the recording head over a selected track, and servo bursts 75 for fine positioning the recording head over a centerline of the selected track while writing and reading data. Additionally, the servo data may comprise data used to locate the relative position of the data sectors rather than record a separate "ID-field" before each data sector. The track addresses 73 are typically detected by an analog or discrete time pulse detector, but they may also be detected using a discrete time sequence detector in a sampled amplitude read channel. The servo bursts 75 are typically detected using an analog or discrete time burst area detector.

The storage capacity at the outer tracks can be increased due to the increase in circumferential recording area and the decrease in ISI. Accordingly, the disk shown in FIG. 1A is partitioned into an outer zone 11 comprising fourteen data sectors per track, and an inner zone 27 comprising seven data sectors per track. In practice, the disk is actually partitioned into several zones, wherein the capacity and data rate increases from the inner to outer zones.

During a seek operation, as the recording head traverses radially over the disk toward a target track, the head may span two adjacent tracks when reading the servo wedges. In this situation, the intertrack interference between adjacent track addresses will induce ambiguity into the detected codeword. For this reason it is important to encode the track addresses such that the ambiguity is resolved in favor of one or the other adjacent track addresses. Conventionally, track addresses are encoded according to a Gray code constraint, meaning that adjacent track address differ in only one bit in the NRZ domain (see FIG. 3). In this manner, the ambiguity in the one differing bit will always be resolved in favor of one of the two adjacent track addresses.

Figure 1C:
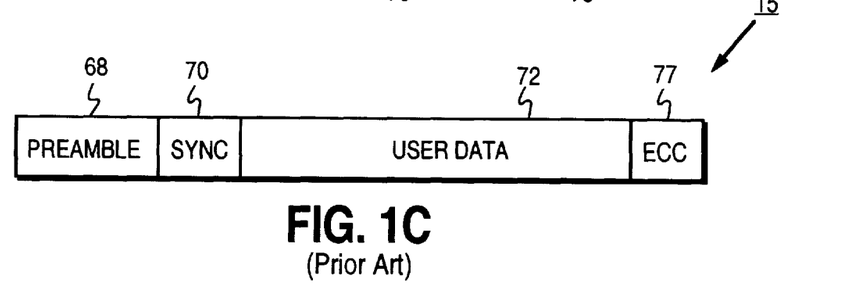
FIG. 1C shows an example format of a data sector of a data track.

FIG. 1C shows an example format of a data sector 15 within a track 13. Similar to a servo sector 17, a data sector 15 comprises a preamble field 68 and a sync field 70 for synchronizing to the sector data (i.e., the user data 72).

Additionally, a data sector typically comprises a number of redundancy bytes 77 associated with a predetermined error correcting code (ECC) for use in detecting and correcting errors in the user data 72 induced by noise in the read signal upon read back. Conventional ECC is normally not employed to correct errors in the servo track addresses 73 presumably because it is not possible to arrange ECC codewords according to the above described conventional Gray code constraint. That is, it is not possible to encode servo track addresses using a conventional error correcting code, and then arrange the codewords such that adjacent codewords differ in only one bit in the NRZ domain.

As will become more apparent from the following description, the present invention overcomes the drawbacks of a conventional Gray code by arranging the codewords such that adjacent codewords are different relative to a distance property of the code. In this manner, the ambiguity created when the recording head spans adjacent tracks during a seek operation will be resolved in favor of one of the adjacent tracks, similar to the conventional Gray code constraint. However, the present invention provides an advantage over a conventional Gray code in that it is capable of correcting errors in the detected codewords, thereby enhancing the reliability of the servo control and allowing the servo data to be recorded at a higher density.

Conventional Sampled Amplitude Read Channel

Figure 2:
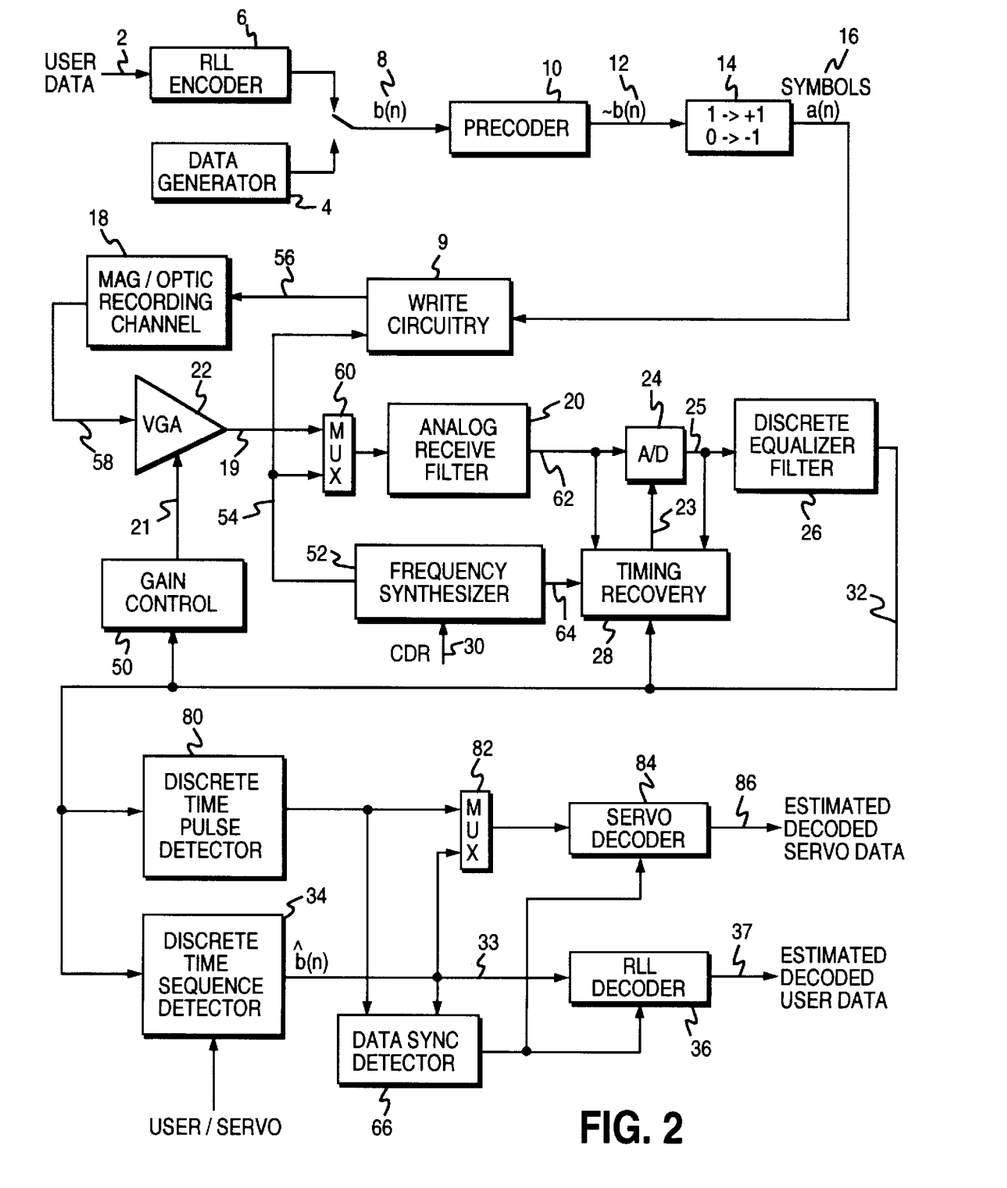
FIG. 2 is a block diagram of a sampled amplitude read channel comprising the servo decoder of the present invention.

Referring now to FIG. 2, shown is a detailed block diagram of a conventional sampled amplitude read channel. During a write operation, a data generator 4 outputs preamble data 68 and a sync mark 70 recorded on the disk prior to recording the user data 72 (see FIG. 1C). An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizer filters to form a precoded sequence ~b(n) 12. The precoded sequence ~b(n) 12 is converted into symbols a(n) 16 by translating 14 ~b(N) =0 into a(N)=−1, and ~b(N)=1 into a(N)=+1. Write circuitry 9, responsive to the symbols a(n) 16, modulates the current in the recording head coil (or intensity of a laser beam) at the baud rate 1/T to record the binary sequence onto the media. A frequency synthesizer 52 provides a baud rate write clock 54 to the write circuitry 9 and is adjusted by a channel data rate signal (CDR) 30 according to the zone the recording head is over.

When reading the recorded binary sequence from the media, timing recovery 28 first locks to the write frequency by selecting, as the input to the read channel, the write clock 54 through a multiplexor 60. Once locked to the write frequency, the multiplexor 60 selects the signal 19 from the read head as the input to the read channel in order to frequency and phase lock to the acquisition preamble 68 recorded on the disk preceding the recorded user data 72. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time equalizer filter 26 provides further equalization of the sample values 25 toward the desired response. In partial response recording, for example, the desired response is often selected from Table 1:

TABLE 1

| Channel | Transfer Function | Dipulse Response |
|---|---|---|
| PR4 | $(1-D)(1+D)$ | 0, 1, 0, −1, 0, 0, 0, ... |
| EPR4 | $(1-D)(1+D)^2$ | 0, 1, 1, −1, −1, 0, 0, ... |
| EEPR4 | $(1-D)(1+D)^3$ | 0, 1, 2, 0, −2, −1, 0, ... |

After equalization, the equalized sample values 32 are applied to a decision directed gain control 50 and timing recovery 28 circuit for adjusting the amplitude of the read signal 58 and the frequency and phase of the sampling device 24, respectively. Timing recovery 28 adjusts the frequency of sampling device 24 over line 23 in order to synchronize the equalized samples 32 to the baud rate, and gain control 50 adjusts the gain of variable gain amplifier 22 over line 21 in order to match the magnitude of the channel's frequency response to the desired partial response. Frequency synthesizer 52 provides a course center frequency setting to the timing recovery circuit 28 over line 64 in order to center the timing recovery frequency over temperature, voltage, and process variations.

The equalized samples Y(n) 32 are ultimately input into a discrete time sequence detector 34, such as a maximum likelihood (ML) Viterbi sequence detector, which detects an estimated binary sequence b̂(n) 33 from the sample values. The servo data may be detected using the discrete time sequence detector 34 or, alternatively, using a discrete time pulse detector 80 as selected through multiplexor 82. An RLL decoder 36 decodes the estimated binary sequence b̂(n) 33 from the sequence detector 34 into estimated user data 37, and a servo decoder 84 decodes the estimated data sequence at the output of multiplexer 82 into estimated servo data 86. A data sync detector 66 detects the sync mark 70 (shown in FIG. 1B and 1C) in the data sector 15 and the servo sector 17 in order to frame operation of the RLL decoder 36 and servo decoder 84, respectively. Details of the servo decoder 84 which operates according to the coding scheme of the present invention are set forth in the following section.

Servo Decoder

Figure 3:
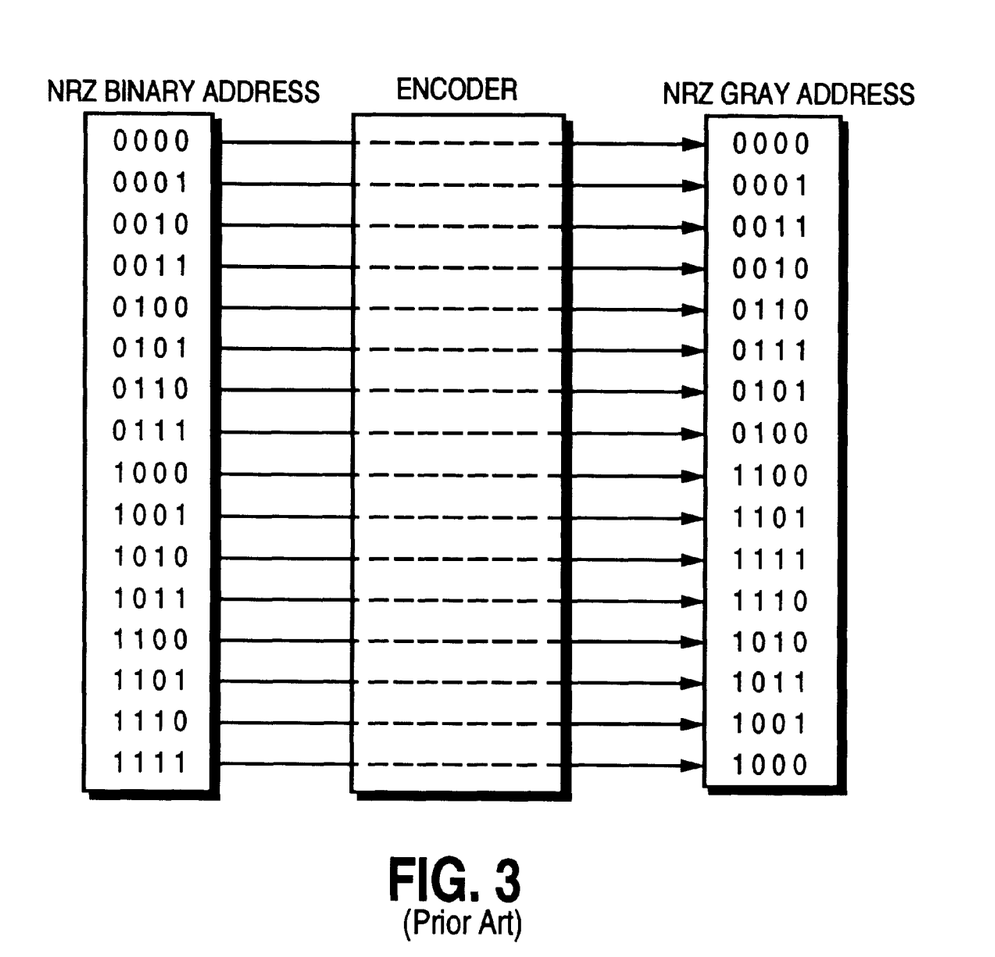
FIG. 3 shows a prior art servo encoder for encoding NRZ binary track addresses into NRZ Gray track addresses.

The servo decoder 84 of FIG. 2 is responsible for decoding the estimated data sequence into a valid track address, even when ambiguity is induced in the read signal due to intertrack interference during a seek operation. FIG. 3 illustrates a prior art servo encoder which operates according to a conventional Gray code; that is, the NRZ binary track addresses are encoded into NRZ Gray code track addresses such that adjacent track addresses differ in only one bit in the NRZ domain. In this manner, when the recording head spans adjacent tracks during a seek operation, the ambiguity in the single bit will not matter because the detected codeword will be decoded into one or the other adjacent track addresses. As described above, however, a conventional Gray code is not capable of correcting random errors in the detected codeword; it corrects only the particular single bit error caused by the intertrack interference of an adjacent track address during a seek operation.

ECC Servo Decoder

The present invention overcomes the limitations of a conventional servo Gray code by encoding the binary track address according to a coding scheme capable of correcting certain random bit errors, as well as resolving the ambiguity as a result of intertrack interference during a seek operation.

FIG. 4 shows an example embodiment of the present invention wherein the NRZ binary track addresses are encoded using a (7,4) Hamming code capable of correcting any random single bit error in a detected codeword. The error correction procedure for the (7,4) Hamming code is well known. First, a syndrome is computed by performing three parity checks on a detected codeword. The three syndrome bits, if nonzero, represent the position of the bit error. The erroneous bit is inverted, thereby correcting the detected codeword (assuming there is only one bit in error). After correction, the codeword is decoded by mapping the seven codeword bits into four information bits using any well known technique such as a lookup table or combinatorial logic.

The equivalent effect of a conventional Gray code is achieved by arranging the resulting codewords such that adjacent codewords are different in a number of bits equal to the minimum distance of the Hamming code. In this manner, the ambiguity caused by intertrack interference can be resolved: if a valid codeword is corrupted such that ambiguity exists in a number of bits equal to the minimum distance of the Hamming code, the ambiguity will be resolved (corrected) in favor of the corrupted codeword or an adjacent codeword. Consider, for example, the first two codewords in the table of FIG. 4: 0000000 and 0101010. If the read head flies between these two codewords during a seek operation, the intertrack interference will introduce ambiguity in the three "1" bits such that the most likely detected codewords are:

```
0000000
0101010

0100000
0001000
0000010
0101000
0001010
0100010.
```

Notice that the erroneous codewords differ by one bit from the adjacent valid codewords 0000000 or 0101010. Thus, the erroneous codewords will be corrected into one or the other adjacent codewords (track addresses), thereby providing the same effect as a conventional Gray code. Unlike a conventional Gray code, however, the present invention corrects or maps several detected codewords into a valid codeword. In other words, the correction process can be viewed as a many-to-one mapping of detected codewords into a valid codeword.

To encode the 12 to 15 bit long track addresses required to represent 4k to 32k number of data tracks, the 7-bit codeword blocks shown in FIG. 4 may be concatenated. To keep the conventional Gray code property, only one block is changed at a time. After the sequence in FIG. 4 is run, a higher order block is changed and the sequence of FIG. 4 is run in reverse order.

The codewords of FIG. 4 can be written to the disk using any of the well known conventional formats, including return to zero (RZ) wherein a "1" bit modulates a magnetic dibit and a "0" bit modulates a no magnetic dibit (i.e., dc), non-return to zero (NRZ) wherein a "1" bit modulates a "positive" flux direction and "0" bit modulates a negative flux direction, or non-return to zero inverse (NRZI) wherein a "1" bit modulates a magnetic flux transition and a "0" modulates no flux transition. The NRZ or NRZI formats are preferred due to the higher information rate and higher density as compared to RZ; however, these formats also require a d=0 detector for accurately detecting the codewords (preferably the sequence detector 34 in FIG. 2). Further, since this particular code results in adjacent magnetic transitions, it requires a write precompensation circuit in the servo writer to compensate for non-linear transition shift (NLTS).

Yet another aspect of this embodiment is that the all "0" bit codeword is employed. It is well known that timing information is derived only when "1" bits are detected in the data sequence, and thus the reason for the k constraint in RLL (d,k) codes: it restricts the maximum number of consecutive "1" bits to k. To achieve an equivalent of the k constraint of an RLL (d,k) code in this embodiment, a dibit is inserted between each concatenated codeword. This dibit is simply ignored when decoding the detected codewords into the binary track address.

Thus, by exploiting the distance property of an error correcting code, codewords can be arranged to achieve the same result as a conventional Gray code. Ambiguity in a detected codeword caused by intertrack interference when the recording head spans two adjacent tracks during a seek operation is resolved in favor of one of the adjacent track addresses. Additionally, the distance property of the error correcting code enables the correction of random bit errors, during both seeking and tracking operations, which improves the performance of servo control and allows the servo data to be recorded at a higher density.

The minimum distance of the example Hamming code shown in FIG. 4 is three. Those skilled in the art will recognize that codes other than the (7,4) Hamming code of FIG. 4 could be used to achieve the same result. For instance, a code with a greater minimum distance could be employed to correct more than a single bit error event. These, and other obvious modifications are within the intended scope of the present invention.

Trellis Detector Servo Code

The basic idea that enables the ECC Hamming code embodiment of the present invention can be extended to the distance properties of a discrete time trellis sequence detector, such as the maximum likelihood Viterbi sequence detector. Consider, for example, the trellis sequence detector associated with a partial response class-IV (PR4) read channel. The transfer function for this channel is represented by the polynomial $(1-D^2)$ where D is a delay operator referring to the channel or baud rate. With the input symbols a(n) 16 of FIG. 2 taking on the values +1 or −1, the output of the channel 32 takes on the values in the set $\{+2,0,-2\}$. The PR4 Viterbi sequence detector 34 operates by examining the channel sample values 32 in context to determine a most likely estimated data sequence associated with the samples.

Figure 5A:
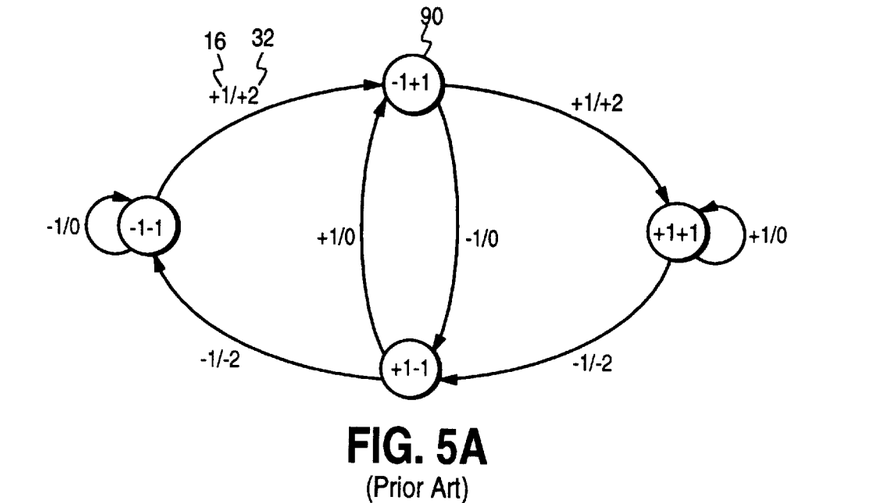
FIG. 5A is a state transition diagram of a conventional partial response class-IV (PR4) sequence detector of a sampled amplitude read channel.

Operation of the PR4 sequence detector is understood from its state transition diagram shown in FIG. 5A. Each state 90 is represented by the last two input symbols a(n) 16 (after precoding 10), and each branch from one state to another is labeled with the current input symbol a(n) 16 and the corresponding sample value 32 it will produce during readback. Thus, during readback the sample sequence can be demodulated into the input symbol sequence a(n) (recorded sequence) according to the state transition diagram. However, noise in the read signal due to timing errors, misequalization, etc., will obfuscate the readback sample values and introduce ambiguity in the correct demodulated data sequence. The function of the Viterbi detector, then, is to resolve this ambiguity by demodulating the sample values into a most likely data sequence.

Figure 5B:
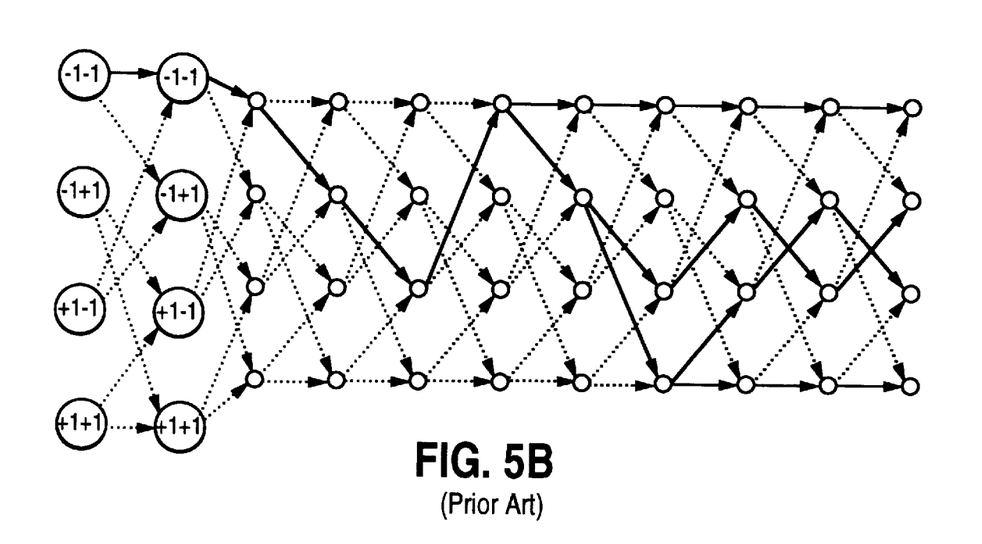
FIG. 5B shows a conventional trellis diagram corresponding to the state transition diagram of FIG. 5A.

The demodulation process of the Viterbi detector is understood by representing the state transition diagram of FIG. 5A as a trellis diagram shown in FIG. 5B. The trellis diagram represents a time sequence of sample values and the possible recorded input sequences a(n) that could have produced the sample sequence. For each possible input sequence a(n), an error metric is computed relative to a difference between the sequence of expected sample values that would have been generated in a noiseless system and the actual sample values read from the channel. For instance, a Euclidean metric is computed as the accumulated square difference between the expected and actual sample values. The input sequence a(n) that generates the smallest Euclidean metric is the most likely sequence to have created the actual sample values; this sequence is therefore selected as the output of the Viterbi detector.

To facilitate the demodulation process, the Viterbi sequence detector comprises path memories for storing each of the possible input sequences a(n) and a corresponding metric. A well known property of a Viterbi sequence detector is that the paths storing the possible input sequences will "merge" into a most likely input sequence after a certain number of sample values are processed (as long as the input sequence is appropriately constrained). In fact, the maximum number of path memories needed equals the number of states in the Trellis diagram; the most likely input sequence will always be represented by one of these paths, and these paths will eventually merge into one path (i.e., the most likely input sequence) after a certain number of sample values are processed.

The "merging" of path memories is understood from the trellis diagram of FIG. 5B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric. As a result, the paths through the trellis corresponding to the branches not selected will merge into the paths that were selected. Eventually, all of the survivor sequences will merge into one path through the trellis which represents the most likely estimated data sequence to have generated the sample values as shown in FIG. 5B.

It is possible for the noise to change the sample values enough such that the most likely sequence selected by the Viterbi detector is actually an incorrect sequence. This is similar to the Hamming distance of an error correcting code. That is, a Viterbi sequence detector has associated with it a minimum distance between the possible data sequences and their corresponding sample sequences. Enough noise in the read signal can result in what is referred to as a minimum distance error event in the detected data sequence. With respect to the trellis diagram, a minimum distance error event can occur between two paths that diverge from a current state and remerge at a later state.

The length of the minimum distance error events (i.e., number of sample periods through the trellis before merging to a common state) varies. If the noise samples in the read channel are statistically independent and have a Gaussian probability distribution, then the minimum distance error events occur with equal probability, regardless as to the length. However, the noise samples in the read channel are not independent Gaussian because the equalizing filters tend to color or correlate the noise samples. This changes the probability distribution of the minimum distance error events and, in particular, changes the distribution such that the minimum length error events are the most likely to occur for the servo data densities of interest in the present invention.

The minimum length error events in a PR4 detector include a single bit shift and a dibit "drop-in" or "drop-out" in the NRZI domain. The single bit shift error event is illustrated by the trellis diagram of FIG. 6A. An example data sequence is shown above the trellis where the top sequence {01100110} is the correct sequence and the bottom sequence {00110110} comprises a bit shift error event. The data sequences are shown in the PR4 domain, where the corresponding bit shift error event in the NRZI domain is the sequence {01000100} with the first "1" bit shifted right by one resulting in {00100100}. From the trellis of FIG. 6A notice that the bit shift error event corresponds to two paths that diverge from the top state and remerge at the bottom state with an error length of three sample periods. An example of a dibit drop-in error event is shown in FIG. 6B where the correct PR4 sequence {00000110} is erroneously detected as the PR4 sequence {01010110}; that is, the NRZI sequence {00000100} is erroneously detected as the NRZI sequence {01100100}. The error event is illustrated in the trellis of FIG. 6B by two paths that diverge from the top state and remerge at the top state three sample periods later. A dibit drop-out error event is the opposite of a dibit drop-in error event and is illustrated by swapping the correct and erroneous sequences in FIG. 6B.

An objective of the present invention, then, is to provide a servo coding scheme that can correct the bit shift and dibit drop-in minimum distance error events of a PR4 sequence detector. (The dibit drop-out error event is not considered because the code is restricted by a run-length limit of d=1 meaning that a dibit cannot occur in a valid codeword.) The property of a conventional Gray code constraint for resolving ambiguity in the detected codewords due to intertrack interference during a seek operation is achieved by arranging the codewords such that adjacent codewords are different relative to a bit shift error event which is the most likely error caused by intertrack interference.

To aid in understanding the trellis servo code embodiment of the present invention, the following terms are defined:

d=1 constraint—a run-length limit (RLL) which constrains to 1 the minimum number of "0" bits that must occur between consecutive "1" bits (in the NRZI domain).

Codeword size—the number of bits in a codeword; the codeword size in the following examples is 12 bits.

Group—the set of binary digits between and including the outermost "1" bits in a codeword. For example the codeword 001010100000 contains the group 10101.

Group length—the number of binary digits in a group. For example the group length of 10101 is 5.

Group shift—a shift of a group left or right by a specified number of bits. For example a group shift right by one of the group 10101 in the codeword 001010100000 gives 000101010000 and a group shift left by one gives 010101000000.

Group set {x}—the set of codewords that can be generated by shifting a particular group x. For example, the group 10101 will generate the group set: 101010000000, 0101000000, 001010100000, 000101010000, 000010101000, 000001010100, 000000101010 and 000000010101.

Single shift—a shift of a single "1" bit in a codeword. For example a single bit shift to the right of bit $b_5$ in the codeword 001010100000 gives 001010010000.

Codeword rank—the number of "1" bits in a codeword.

Identical transitions—two flux transitions ("1" bits in NRZI) in two codewords that occur in exactly the same location in the codewords and lead to the same flux state.

Similar transitions—two flux transitions ("1" bits in NRZI) in two codewords that are not in the same location, but still lead to the same flux state. Additionally, two consecutive flux transitions of one of the codewords must be interleaved with the corresponding flux transitions of the other codeword. That is, two flux transitions of one codeword cannot occur between two flux transitions of the other codeword. In the codewords:

000100001010, and
000101000010, the first and last transitions are identical and the inner transitions are similar. In the codewords:

001010000100, and
000100001010, all transitions are similar and none are identical. And in the codewords:

100001010000, and
010100001000, none of the transitions are identical or similar.

The following embodiment of a trellis servo code according to the present invention comprises a d=1 constraint in the codewords because servo writers do not normally employ a write precompensation circuit to compensate for non-linear transition shift (NLTS). The d=1 constraint is taken into account and aids in implementing the servo code, but the constraint is not necessary in the general sense of the invention. That is, one skilled in the art could easily devise a servo code according to the aspects of the present invention without a d=1 constraint.

Figure 7:
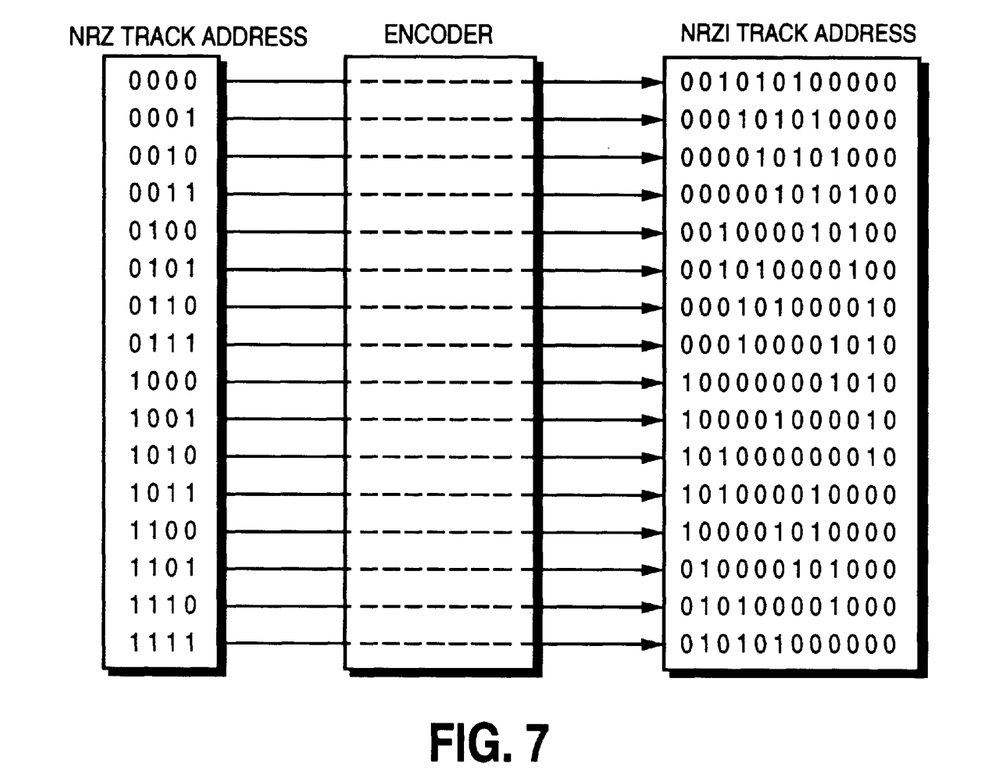
FIG. 7 illustrates another embodiment of the present invention which encodes the servo track addresses in a manner that corrects the single bit shift error events of FIG. 6A and the dibit "drop-in" error events of FIG. 6B, and further arranges the codewords such that adjacent track addresses differ by exactly three bit shifts to effectuate the conventional Gray code constraint.

A servo encoder for encoding the binary NRZ track addresses into NRZI track addresses according to the present invention is shown in FIG. 7. Any well known technique can be employed to implement the servo encoder including a lookup table or combinatorial logic. To aid understanding the present invention, the following notation is used to represent each codeword in the table of FIG. 7:

$$0^{k0}1_0 0^{k1} 1_1 0^{k2} \ldots 1_n 0^{kn}$$

where the superscripts indicate the number of times a "0" bit is repeated in succession, the subscripts are indices of the "1" bits, and n is the rank of the codewords (number of "1" bits in each codeword which is constant). For example the first codeword in the table of FIG. 7 001010100000 is represented as k0=2, k1=1, k2=1, k3=5, and n=3. In order to satisfy the d=1 constraint when codewords are concatenated, it requires either that k0>0 or kn>0. In the example of FIG. 7, kn>0, but the choice is arbitrary.

Figure 6A:
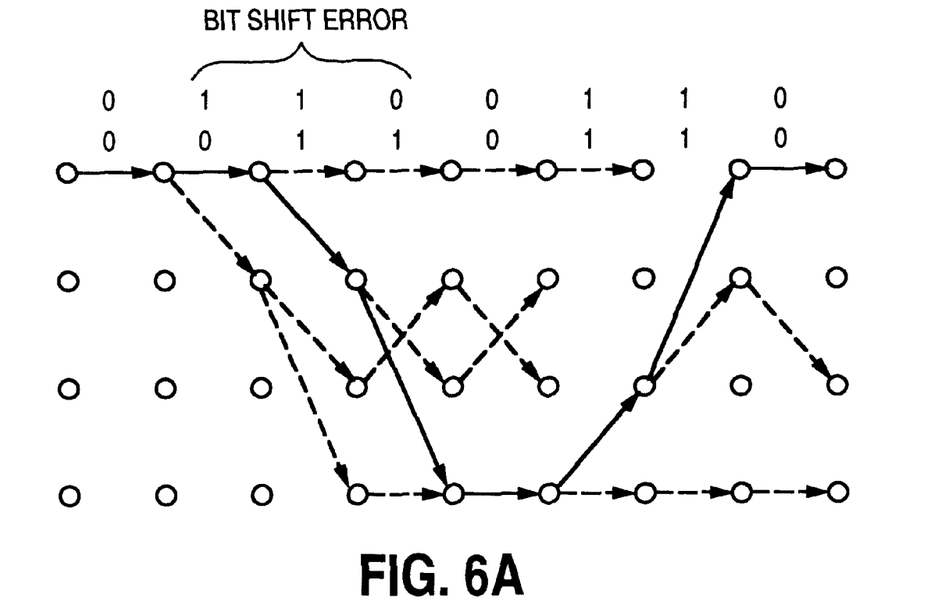
FIG. 6A shows an example sample sequence as it is processed through the trellis of FIG. 5B and a minimum distance error event caused by a single bit shift in the NRZI domain.
Figure 6B:
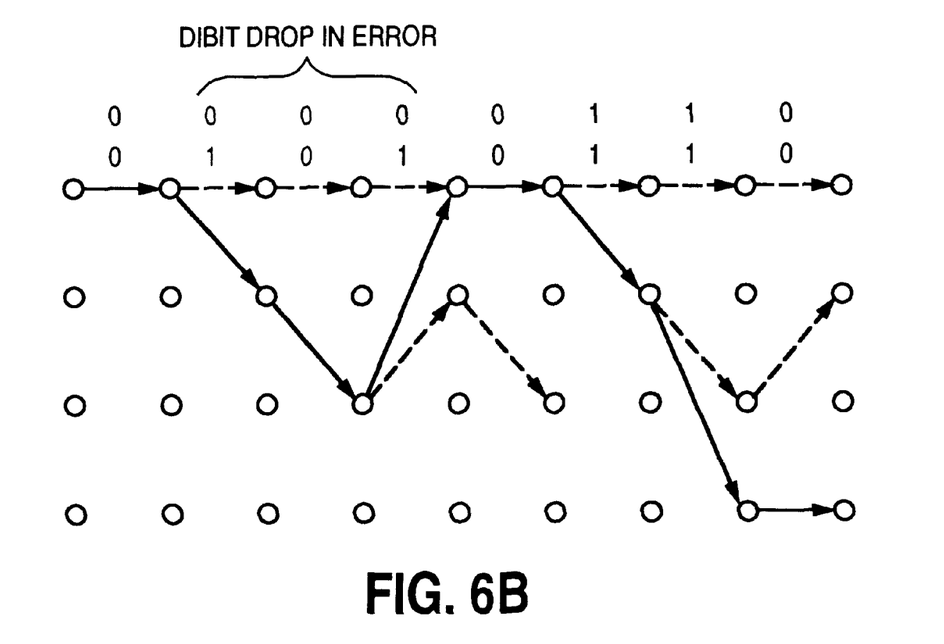
FIG. 6B shows an example sample sequence as it is processed through the trellis of FIG. 5B and a minimum distance error event caused by a dibit "drop-in" in the NRZI domain.

The distance property of the codewords with respect to the single bit shift error event illustrated by the trellis diagram of FIG. 6A is understood as follows. Consider an arbitrary group A with three "1" bits (i.e., the rank is n=3), then all of the codewords in the group set {A} differ by three single "1" bit shifts from each other; that is, any group shift by one in either direction involves three single "1" bit shifts. Consider a second group B, where B differs from A by three single "1" bit shifts. Again, all of the codewords in the group set {B} differ from each other by three single "1" bit shifts, and additionally, since group B differs from group A by three single "1" bit shifts, the codewords in the group set {B} must differ from each codeword in the group set {A} by at least three single "1" bit shifts. Thus, group examination is all that is required to construct the table of codewords in FIG. 7 such that each codeword differs by three single "1" bit shifts, and therefore have the property that a single "1" bit shift in any codeword can be corrected.

In particular, note that the group in any codeword of FIG. 7 includes the bits from $1_1$ to $1_n$. The codewords of FIG. 7 were derived according to the following constraint: k1 mod 3=1, k2 mod 3=1, . . . , k(n−1) mod 3=1 where "mod" is modulo division. This is referred to as the "k mod 3" constraint and it (together with the kn>0 constraint) satisfies both the d=1 constraint and the single shift distance requirement.

There are some codewords where k0=0 and a single shift to the left of $1_1$ would shift it out of the codeword, thereby producing a detected codeword with less than three "1" bits. This is easily resolved: It is impossible for $1_n$ to shift to the right out of any codeword by a single shift due to the kn>0 constraint, so if a codeword containing two "1" bits is detected, it is corrected by simply inserting a "1" bit in the first position.

Turning now to the dibit drop-in error event illustrated in FIG. 6B, in the NRZI domain, a drop-in error event is the insertion of two consecutive "1" bits into a detected codeword. It is easy to detect this error because the detected codeword will contain more than three "1" bits. To correct the error, it must be unambiguous which extra "1" bits should be removed from the detected codeword. The following discussion demonstrates that the ability to correct the dibit drop-in error event is a result of the d=1 and k mod 3 constraints (as well as a "kn←→size" constraint described below).

A dibit drop-in error will manifest in different ways, with the most basic distinction being whether it results in one extra "1" bit or two extra "1" bits in the detected codeword. A single extra "1" bit will occur if the dibit drop-in occurs across the detected codeword's boundary with a concatenated codeword. Two extra "1" bits will occur if a dibit drop-in occurs entirely within the detected codeword or if it occurs at both ends of the codeword across the boundary of concatenated codewords. Within these broad distinctions, there are further distinctions, and each case is shown to be correctable assuming a dibit drop-in is the only error.

Consider the case where a detected codeword contains an extra "1", bit. In this case, the drop-in error event must occur across the codeword boundary, that is, the extra "1" bit must be either in the most significant bit or in the least significant bit. If the least significant bit is a "1" bit, it must be in error due to the above kn>0 constraint. Otherwise the error must occur in the most significant bit (the most significant bit contains the extra "1" bit). Thus, changing the erroneous "1" bit to a "0" bit generates the correct codeword. Note that an erroneous "1" bit in the least significant bit of a detected codeword can occur due to a dibit drop-in across the codeword boundary, or by the $1_1$ bit of the previously detected codeword shifting to the left by one (i.e., due to a bit shift error event). In either case, the result is the same as a dibit drop-in error event in decoding the current codeword correctly.

Now consider the case where a detected codeword contains two extra "1" bits and the least significant bit is a "0" bit. In this case, the detected codeword comprises two adjacent "1" bits in error. If the adjacent "1" bits in error occur next to a correct "1" bit, then the detected codeword will comprise three adjacent bits. In any event, there will only be one pair of adjacent "1" bits that can be removed without violating the "k mod 3" constraint described above.

This is proven by noting that regardless of where the adjacent erroneous "1" bits occur, there must be a correct "1" bit either to the left or right of the adjacent erroneous "1" bits giving a "section" of a detected codeword of the form $1110^k$. "Section" here means the three adjacent "1" bits (two in error) and the number of "0" bits following denoted by $0^k$. To satisfy the "k mod 3" constraint, either k mod 3=1, in which case the first two "1" bits are in error, or (k+2) mod 3=1, in which case the latter two "1" bits are in error. Since it is impossible for k mod 3=1 and (k+2) mod 3=1, the codeword correction is unambiguous.

Finally, consider the case where a detected codeword contains two extra "1" bits and the least significant bit is a "1" bit. In this case, the "1" bit in the least significant bit must be in error due to the kn>0 constraint, which leaves two possibilities: either the dibit drop-in error event occurred at the end of the codeword and the $b_1$ bit is in error, or the dibit drop-in error event occurred across the codeword boundaries in which case the most significant bit $b_n$ is an erroneous "1" bit. If only one of these bits is a "1" bit, then the codeword is corrected by changing that bit and the least significant bit to "0". If both of these bits are "1" bits, then only one can be changed without violating the "k mod 3" constraint. This is true as long as an additional constraint referred to as the "kn←→size" constraint is satisfied.

The "kn←→size" constraint requires that valid codewords belong to a set such that if k0=0, kn mod 3!=0. This is because if k0=0, then $1_1$ is in the most significant bit of the codeword, and if kn mod 3=0 (and kn>0), a dibit drop-in error could occur in the least two significant bits of a detected codeword which would reduce the distance between $1_n$ and the dibit drop-in to k(n-2) where k(n-2) mod 3=1. This would lead to ambiguity in decoding detected codewords as illustrated by the following example.

Consider a set of codewords where n=3 and the codeword length is 14. An ambiguity would exist in differentiating between valid codewords 10000100001000 and 00000100001010. The first codeword could be changed by a dibit drop-in error in the least two significant bits resulting in 10000100001011, while the second codeword could be changed by a dibit drop-in error occurring over both boundaries also resulting in 10000100001011. Thus, two valid codewords can be changed into the same erroneous codeword by a minimum distance error event (a dibit drop-in) that would otherwise be correctable. It is possible to avoid this ambiguity by selecting the codeword size appropriately in view of the codeword rank, n. Because the codeword size is a function of kn, this constraint is referred to as the "kn←→size" constraint.

To provide the same effect as a conventional Gray code, the present invention further encodes the following constraints:
1. adjacent codewords differ either by n single shifts, where n is the codeword rank, or by exactly three single shifts of one transition; and
2. in the case where adjacent codewords differ by n single shifts, all of the transitions are similar; and in the case where adjacent codewords differ by exactly three single shifts of one transition, all except the shifted transition are identical.

The above constraints are sufficient to achieve the same effect as a conventional Gray code, as explained below, but may not be necessary. In other words, there may be different constraints that provide the same effect; such modifications are within the intended scope of the present invention.

To illustrate the above constraints, consider the first two codewords in the table of FIG. 7 which differ by n single shifts and which have similar transitions as defined above. The corresponding flux transitions are:

| codeword | flux |
|---|---|
| 001010100000 | +++--++------ |
| 000101010000 | ++++--++-----. |

The most likely errors caused by intertrack interference during a seek operation are bit shift errors, that is, errors in detecting when the flux transitions occur. Thus, the most likely detected codewords are:

| codeword | flux |
|---|---|
| 001010100000 | +++--++------ |
| 000101010000 | ++++--++----- |
| 001001100000 | +++---+------ |
| 001001010000 | +++---++------ |
| 000110100000 | ++++-++------ |
| 000100110000 | ++++---+-----. |

Notice that the erroneous codewords differ from one or the other valid adjacent codewords by a single bit shift, an error that can be corrected by the present invention as described above. In other words, the most likely erroneous detected codewords will decode properly into one or the other adjacent valid codewords, thereby providing the same effect as a conventional Gray code.

Now consider the last two codewords in the Table of FIG. 7 which differ by exactly three single shifts of one transition where all but the shifted transition are identical. The corresponding flux transitions are:

| codeword | flux |
|---|---|
| 010100001000 | ++--+++++---- |
| 010101000000 | ++--++-------. |

The most likely detected codewords are:

| codeword | flux |
|---|---|
| 010100001000 | ++--+++++---- |
| 010101000000 | ++--++------- |
| 010100100000 | ++--+++------ |
| 010100010000 | ++--++++-----. |

Again, notice that the erroneous codewords differ from one or the other valid adjacent codewords by a single bit shift, an error that can be corrected by the present invention as described above. In other words, the most likely erroneous detected codewords will decode properly into one or the other adjacent valid codewords, thereby providing the same effect as a conventional Gray code.

Intertrack interference from an adjacent track address may also induce errors if the read head is oscillating around the centerline of the target track as it "pulls in" at the end of a seek, or due to an external distubance while tracking the centerline during read and write operations. This may result in a bit shift error event as described above, but it may also result in a dibit drop-in error event. Consider, for example, a situation where the read head is following the centerline of a track with a track address of 010100001000. Intertrack interference from an adjacent track with a track address of 010101000000 can result in a dibit drop-in error event resulting in a erroneously detected codeword of 010100111000. This is illustrated by the flux transitions where the read head deviates from the centerline and then back:

| codeword | flux |
|---|---|
| 010100001000 | ++--+++++---- |
| 010101000000 | ++--++------- |
| 010100111000 | ++--+++-+----. |

As described above, however, a dibit drop-in is a correctable error event; the present invention still retains the desireable property of a conventional Gray code.

Thus, by arranging the codewords such that adjacent codewords differ relative to a correctable error event in the sequence detector, the coding scheme of the present invention provides the same desirable effect as a conventional Gray code. This, again, is similar to arranging the codewords relative to the Hamming distance in the Hamming code embodiment of the present invention described above. Further, those skilled in the art will recognize that the present invention could be applied to other data detection techniques, such as extended partial response (EPR), decision feedback equalization (DFE), etc., and even future data detection techniques not yet developed, as long as the distance properties are exploited in a manner taught herein. Further, the above constraints for achieving the desired Gray code property are sufficient, but other constraints may exist that provide the same effect. In yet another alternative embodiment, the present invention could be used in combination with known and future sequence detectors matched to a trellis code constraint.

Figure 8:
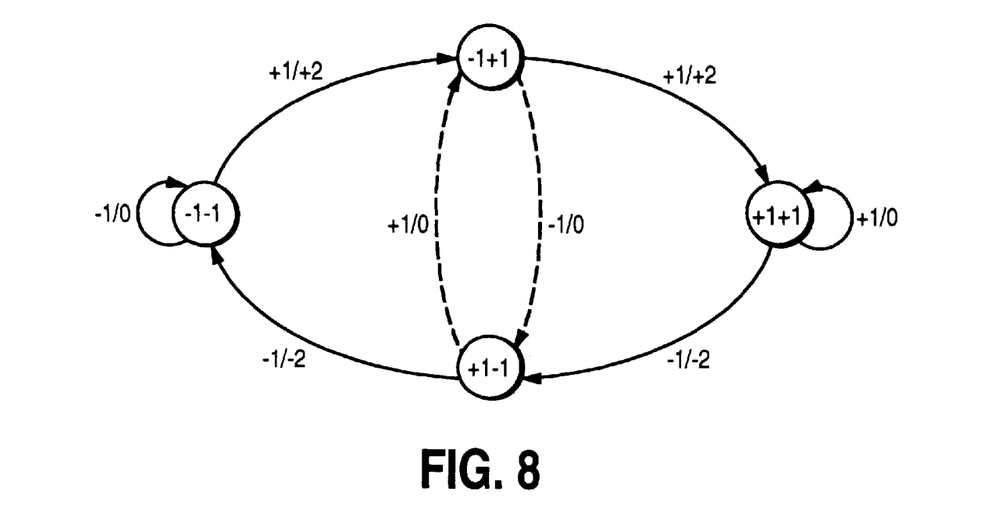
FIG. 8 is a state diagram of a modified PR4 sequence detector matched to a RLL d=1 code constraint.

For example, the RLL d=1 code constraint can be viewed as one type of trellis code if the sequence detector is "matched" to the constraint. This is illustrated in FIG. 8 which shows the state transition diagram for a conventional PR4 read channel similar to FIG. 5A, except that the inner branches (shown as dotted lines) are deleted due to the d=1 constraint. That is, since the d=1 constraints prevents consecutive "1" bits or transitions from occurring, the corresponding transitions are deleted from the state diagram. This improves the overall coding gain for the system since certain errors are "coded out". For example, the above described dibit drop-in error is coded out by the sequence detector and, therefore, need not be considered in developing the error correcting servo code. Consequently, it may be possible to design a more efficient (higher rate) error correcting servo code.

Also, as just mentioned, a detector matched to a trellis code constraint (such as d=1 shown in FIG. 8) provides additional error correcting gain over a conventional sequence detector (such as in FIG. 5A). For example, a PR4 sequence detector matched to a d=1 constraint "corrects" all dibit drop-in error events, and the servo code can correct a predetermined number of additional error events, such as the single bit shift error event described above.

The intrinsic drawbacks, however, in implementing a sequence detector matched to a trellis code constraint typically include decreased throughput and increased complexity. For example, a conventional PR4 sequence detector that operates according to FIG. 5A can be implemented simply as a pair of interleaved sliding threshold sequence detectors, where each interleaved detector operates at half the baud rate. Conversely, a PR4 sequence detector matched to a d=1 constraint, as in FIG. 8, requires a more complex add-compare-select (ACS) type of sequence detector that must operate at the baud rate. It is possible, however, to achieve the performance gain of a PR4 sequence detector matched to a d=1 constraint using only a 1+D filter and a sliding threshold detector. This detector is described in the following section.

EPR4 Sliding Threshold Servo Detector

Figure 9A:
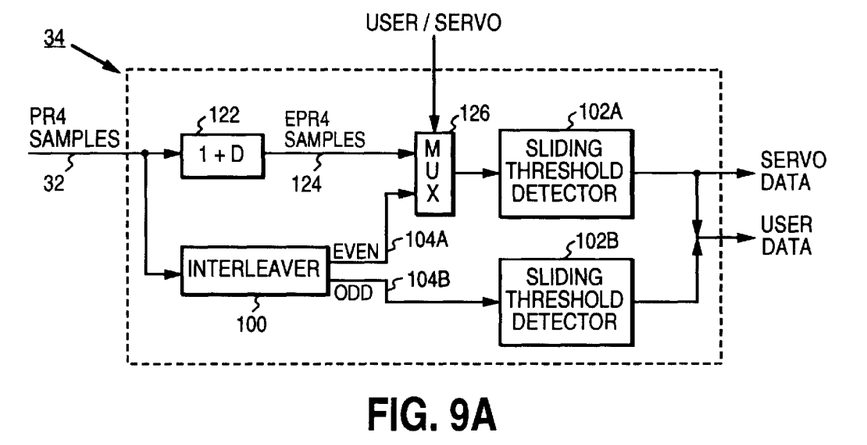
FIG. 9A shows details of the preferred embodiment of the sequence detector when the read channel is equalized into a PR4 response.

FIG. 9A shows the preferred embodiment of the present invention for detecting both the user data and servo data in a PR4 read channel. The analog receive filter 20 and discrete equalizer filter 26 of FIG. 2 equalize the channel samples 32 into a PR4 response. It is well known that a PR4 detector for detecting the user data can be implemented as a pair of sliding threshold detectors 102A and 102B which operate on the even and odd interleaves of the PR4 channel samples 32 (which are dicode sequences). Although FIG. 9A shows an interleaver 100 for extracting the even interleave 104A and the odd interleave 104B of the PR4 channel samples 32, the preferred embodiment is to perform the interleaving operation at the output of the sampling device 24; that is, the discrete-time circuitry (equalizer, timing recovery, gain control, etc.) process two samples at time (an even and odd sample). However, this is only an implementation detail that is not necessary to understand the present invention.

Figure 9B:
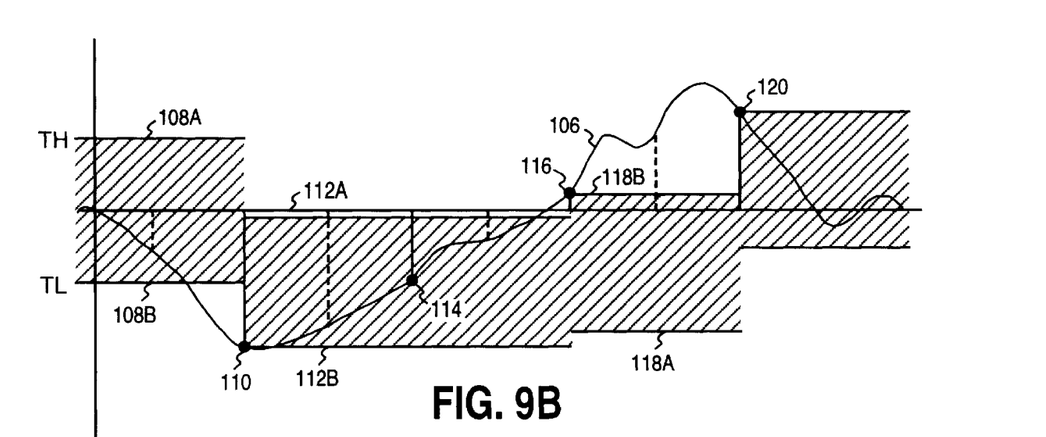
FIG. 9B illustrates the operation of a sliding threshold detector typically employed in a PR4 read channel.

The operation of the sliding threshold detectors 102A and 102B is understood with reference to FIG. 9B which shows the even interleave samples of the analog read signal 106. Each detector comprises a programmable high threshold 108A and programmable low threshold 108B. A binary "1" bit is output by the detector if the current channel sample exceeds either threshold, and a binary "0" bit is output otherwise. When the current sample value exceeds the threshold, the thresholds are adjusted, or slide, toward the sample value as shown.

Figure 9C:
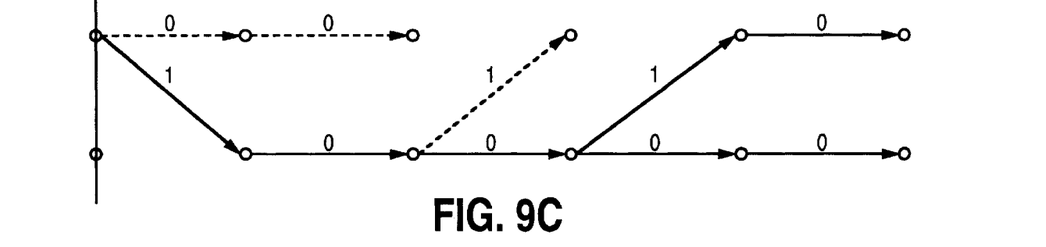
FIG. 9C is a two-state trellis diagram corresponding to the path memories of the sliding threshold detector of FIG. 9B.

The detected data sequences are stored in an upper and lower path memory which represent a two-state trellis as shown in FIG. 9C. For example, when channel sample 110 is processed, the detector stores a "0" bit in the upper path memory and a "1" bit in the lower path memory since the sample 110 exceeds the lower threshold 108B. The detector then adjusts the thresholds downward to thresholds 112A and 112B. The next channel sample 114 is within the thresholds so the detector outputs a "0" bit for both path memories. The next channel sample 116 exceeds the higher threshold 112A, so the sequence detector merges the upper path memory into the lower path memory up to that point (denoted as the solid line in FIG. 9C). The detector then stores a "1" bit in the upper path memory and a "0" bit in the lower path memory, and adjusts the thresholds upward to thresholds 118A and 118B. Because the next sample value 120 also exceeds the higher threshold 118B, the upper path memory again merges into the lower path memory, and a "1" and "0" bit are stored in the upper and lower path memories, respectively.

Notice that the path memories merge into a single survivor sequence each time the current sample value exceeds either threshold. The survivor sequence represents the most likely input sequence to have generated the channel samples relative to the mean squared sample errors, where a sample error is the difference between an actual sample value and an ideal sample value. Thus, the sliding threshold detector is a maximum likelihood detector for a dicode sequence.

An aspect of the present invention is to convert the channel samples of the servo data from a PR4 response to an EPR4 response, thereby allowing the servo data to be detected as a dicode sequence using a sliding threshold detector. It has been determined that the performance gain provided by this modification is equivalent to detecting the servo data with a PR4 sequence detector matched to a d=1 constraint. The performance gain is due to the servo code correcting single bit shift error events as described above, and the sliding threshold detector correcting (i.e., preventing) dibit "drop-in" error events and longer bit shift error events.

Another advantage of this embodiment is that one of the sliding threshold detectors already provided in the read channel for detecting the user data can be advantageously shared to detect the servo data. The only additional hardware required is a 1+D filter 122 shown in FIG. 9A for converting the PR4 samples 32 into EPR4 samples 124. A multiplexer 126 is also provided to select between the user data and servo data depending on whether the read head is over a user or servo data sector. Thus, sliding threshold detector 102A detects the even interleave of the user data and both the even and odd interleaves of the servo data. In FIG. 1, the output of the discrete time sequence detector 34 is selected through multiplexer 82 as the input to the servo decoder.

Servo Decoder

A conventional servo decoder that operates according to a Gray code constraint maps detected codewords into the corresponding binary track address using a one-to-one mapping relationship. For example, the detected codewords representing the NRZ gray addresses shown in FIG. 3 map one-to-one into the corresponding NRZ binary track addresses. In contrast, the error correction capability of the present invention is achieved using a many-to-one mapping relationship. All of the detected codewords that differ from a valid codeword by a bit shift or a dibit drop-in error event are mapped to that valid codeword.

The actual mapping of binary track addresses to NRZI track address according to the example trellis servo code described above is shown in Table 2. The last column of Table 2 comprises the detected codewords that correspond to a bit shift or dibit drop-in error event in the valid codeword shown in the second column. That is, the servo decoder 84 of FIG. 2 maps all of the detected codewords in the third column to the corresponding valid codeword in the second column in order to correct all bit shift and dibit drop-in error events. In practice, the detected codewords are actually mapped to the binary representation of the track address shown in the first column of Table 2. A decoder 84 for mapping the detected codewords to the corresponding valid codeword can be implemented using any well known technique such as a lookup table or combinatorial logic.

Similar to the Hamming code embodiment described above, to encode the 12 to 15 bit long track addresses required to represent 4k to 32k number of data tracks, the 12-bit codeword blocks shown in FIG. 7 may be concatenated. To keep the conventional Gray code property, only one block is changed at a time. After the sequence in FIG. 7 is run, a higher order block is changed and the sequence of FIG. 7 is run in reverse order.

The objects of the invention have been fully realized through the embodiments disclosed herein. Those skilled in the art will appreciate that the aspects of the invention can be achieved through various other embodiments without departing from the essential function. The particular embodiments disclosed are illustrative and not meant to limit the scope of the invention as appropriately construed by the following claims.

TABLE 2

| BINARY | NRZI ADDRESS | NRZI DETECTED CODEWORDS |
|---|---|---|
| 0000 | 001010100000 | 001010100000 or 010010100000 or 001011000000 or 001100100000 or 000110100000 or 001010010000 or 001001100000 or 111010100000 or 001010111000 or 001010101100 or 001010100110 or 001010100011 or 101010100001 or 001010100001 or 101010100000 |
| 0001 | 000101010000 | 000101010000 or 001001010000 or 000101100000 or 000011010000 or 000101001000 or 000100110000 or 110101010000 or 011101010000 or 000101011100 or 000101010110 or 000101010011 or 100101010001 or 000101010001 or 100101010000 or 000110010000 |
| 0010 | 000010101000 | 000010101000 or 000100101000 or 000010110000 or 000011001000 or 000001101000 or 000010100100 or 000010011000 or 110010101000 or 011010101000 or 001110101000 or 000010101110 or 000010101011 or 100010101001 or 000010101001 or 100010101000 |
| 0011 | 000001010100 | 000001010100 or 000010010100 or 000001011000 or 000001100100 or 001101010100 or 000111010100 or 110001010100 or 011001010100 or 000001010111 or 100001010101 or 100001010100 or 000001010101 or 000000110100 or 000001001100 or 000001010010 |
| 0100 | 001000010100 | 001000010100 or 000100010100 or 001011010100 or 001110010100 or 001000100100 or 111000010100 or 001001110100 or 001000010111 or 101000010101 or 101000010100 or 001000010101 or 010000010100 or 001000001100 or 001000011000 or 010000010010 |
| 0101 | 001010000100 | 001010000100 or 001001000100 or 001010110100 or 001011100100 or 000110000100 or 001010000010 or 111010000100 or 001010011100 or 001010000111 or 101010000101 or 101010000100 or 001010000101 or 010010000100 or 001100000100 or 001010001000 |

TABLE 2-continued

| BINARY | NRZI ADDRESS | NRZI DETECTED CODEWORDS |
|---|---|---|
| 0110 | 000101000010 | 000101000010 or 001001000010 or 000101000100 or 000110000010 or 000100100010 or 000101011010 or 000101110010 or 110101000010 or 011101000010 or 000101001110 or 100101000011 or 100101000010 or 000101000011 or 000011000010 or 000101000001 |
| 0111 | 000100001010 | 000100001010 or 000100010010 or 000101101010 or 001100001010 or 110100001010 or 011100001010 or 000111001010 or 000100111010 or 100100001011 or 100100001010 or 000100001011 or 000016001010 or 000100000110 or 000100001100 or 000100001001 |
| 1000 | 100000001010 | 100000001010 or 010000001010 or 101100001010 or 100000010010 or 100001101010 or 111000001010 or 100110001010 or 100011001010 or 100000111010 or 100000001011 or 000000001011 or 000000001010 or 100000000110 or 100000001100 or 100000001001 |
| 1001 | 100001000010 | 100001000010 or 100000100010 or 100001011010 or 100001110010 or 100010000010 or 101101000010 or 100111000010 or 111001000010 or 100001001110 or 100001000011 or 000001000011 or 000001000010 or 010001000010 or 100001000100 or 100001000001 |
| 1010 | 101000000010 | 101000000010 or 100100000010 or 101011000010 or 101110000010 or 101000000100 or 101000011010 or 101000001110 or 101001100010 or 101000110010 or 101000000011 or 001000000011 or 001000000010 or 011000000010 or 110000000010 or 101000000001 |
| 1011 | 101000010000 | 101000010000 or 101000001000 or 101000010110 or 101000011100 or 100100010000 or 101011010000 or 101110010000 or 101001110000 or 101000010011 or 101000010001 or 001000010001 or 001000010000 or 011000010000 or 110000010000 or 101000100000 |
| 1100 | 100001010000 | 100001010000 or 100010010000 or 101101010000 or 100111010000 or 010001010000 or 100001001000 or 100000110000 or 111001010000 or 100001011100 or 100001010110 or 100001010011 or 100001010001 or 000001010001 or 000001010000 or 100001100000 |
| 1101 | 010000101000 | 010000101000 or 100000101000 or 010000110000 or 010001001000 or 010110101000 or 010011101000 or 011100101000 or 010000101110 or 010000101011 or 110000101001 or 010000101001 or 110000101000 or 001000101000 or 010000011000 or 010000100100 |
| 1110 | 010100001000 | 010100001000 or 010010001000 or 010101101000 or 010111001000 or 010100010000 or 010100111000 or 010100001110 or 010100001011 or 110100001001 or 010100001001 or 110100001000 or 100100001000 or 001100001000 or 011000001000 or 010100000100 |
| 1111 | 010101000000 | 010101000000 or 010101011000 or 010100100000 or 001101000000 or 010011000000 or 010101110000 or 010101001100 or 010101000110 or 010101000011 or 110101000001 or 010101000001 or 110101000000 or 100101000000 or 011001000000 or 010110000000 |

We claim:

1. A sampled amplitude read channel for reading user data and servo data recorded on a disk storage medium by detecting an estimated data sequence from discrete time sample values generated by sampling an analog read signal emanating from a read head positioned over the disk storage medium, comprising:

(a) a sampling device for sampling the analog read signal to generate the discrete-time sample values;

(b) a discrete-time equalizer for equalizing the discrete-time sample values into PR4 sample values;

(c) a conversion filter for converting the PR4 sample values into EPR4 sample values;

(d) a first sliding threshold detector for detecting the servo data from the EPR4 sample values; and (e) a servo decoder for decoding the servo data into a servo track address.

2. The sampled amplitude read channel as recited in claim 1, further comprising a discrete-time timing recovery circuit, responsive to the PR4 sample values, for generating synchronous sample values.

3. The sampled amplitude read channel as recited in claim 2, further comprising a discrete-time sequence detector for detecting the estimated data sequence from the synchronous sample values.

4. The sampled amplitude read channel as recited in claim 3, wherein the discrete-time sequence detector comprises:

(a) the first sliding threshold detector for detecting a first and second interleave of the servo data and a first interleave of the user data; and (b) a second sliding threshold detector for detecting a second interleave of the user data.

5. The servo decoder as recited in claim 1, wherein the servo decoder corrects a single bit shift error event in the detected servo data.

6. The servo decoder as recited in claim 1, wherein the servo track address comprises a d=1 run-length constraint.

7. The servo decoder as recited in claim 1, wherein the conversion filter is a 1+D filter.

8. A sampled amplitude read channel for reading user data and servo data recorded on a disk storage medium by detecting an estimated data sequence from discrete time sample values generated by sampling an analog read signal emanating from a read head positioned over the disk storage medium, comprising:

(a) a sampling device for sampling the analog read signal to generate the discrete-time sample values;

(b) a discrete-time equalizer for equalizing the discrete-time sample values into first partial response sample values;

(c) a conversion filter for converting the first partial response sample values into second partial response sample values;

(d) a servo data detector for detecting the servo data from the second partial response sample values; and (e) a servo decoder for decoding the servo data in to a servo track address.

9. The sampled amplitude read channel as recited in claim 8, further comprising a discrete-time timing recovery circuit, responsive to the first partial response sample values, for generating synchronous sample values.

10. The sampled amplitude read channel as recited in claim 9, further comprising a discrete-time sequence detector for detecting the estimated data sequence from the synchronous sample values.

11. The sampled amplitude read channel as recited in claim 10, wherein the discrete-time sequence detector comprises:

(a) a first sliding threshold detector for detecting a first and second interleave of the servo data and a first interleave of the user data; and (b) a second sliding threshold detector for detecting a second interleave of the user data.

12. The servo decoder as recited in claim 8, wherein the servo decoder corrects a single bit shift error event in the detected servo data.

13. The servo decoder as recited in claim 8, wherein the servo track address comprises a d=1 run-length constraint.

14. The servo decoder as recited in claim 8, wherein the conversion filter is a 1+D filter.

15. The servo decoder as recited in claim 8, wherein:

(a) the first partial response sample values are PR4 sample values; and (b) the second partial response sample values are EPR4 sample values.

16. A sampled amplitude read channel for reading user data and servo data recorded on a disk storage medium by detecting an estimated data sequence from discrete time sample values generated by sampling an analog read signal emanating from a read head positioned over the disk storage medium, comprising:

(a) a sampling device for sampling the analog read signal to generate the discrete-time sample values;

(b) a discrete-time equalizer for equalizing the discrete-time sample values into partial response sample values;

(c) a discrete-time sequence detector comprising a first sliding threshold detector for detecting a first and second interleave of the servo data and a first interleave of the user data, and a second sliding threshold detector for detecting a second interleave of the user data; and (d) a servo decoder for decoding the servo data into a servo track address.

17. The servo decoder as recited in claim 16, wherein the servo decoder corrects a single bit shift error event in the detected servo data.

18. The servo decoder as recited in claim 16, wherein the servo track address comprises a d=1 run-length constraint.

* * * * *